United States Patent
Park

(10) Patent No.: US 11,780,416 B2
(45) Date of Patent: Oct. 10, 2023

(54) APPARATUS AND METHOD FOR DETECTING OFFSET OF MOTOR POSITION SENSOR

(71) Applicant: HYUNDAI MOBIS CO., Ltd., Seoul (KR)

(72) Inventor: Hong Joo Park, Yongin-si (KR)

(73) Assignee: HYUNDAI MOBIS CO., Ltd., Seoul (KR)

( * ) Notice: Subject to any disclaimer, the term of this patent is extended or adjusted under 35 U.S.C. 154(b) by 0 days.

(21) Appl. No.: 16/890,916

(22) Filed: Jun. 2, 2020

(65) Prior Publication Data

US 2020/0384965 A1 Dec. 10, 2020

(30) Foreign Application Priority Data

Jun. 7, 2019 (KR) .................. 10-2019-0067206

(51) Int. Cl.
*B62D 5/04* (2006.01)
*B60T 8/171* (2006.01)
(Continued)

(52) U.S. Cl.
CPC .............. *B60T 8/171* (2013.01); *B60T 8/172* (2013.01); *B60T 13/166* (2013.01);
(Continued)

(58) Field of Classification Search
CPC .. H02P 6/182; H02P 6/16; H02P 21/18; H02P 21/06; H02P 23/14; H02P 21/00;
(Continued)

(56) References Cited

U.S. PATENT DOCUMENTS

2005/0104551 A1* 5/2005 Nishimura .............. H02P 21/08
318/719
2007/0132423 A1* 6/2007 Ajima ...................... H02P 6/10
318/719
(Continued)

FOREIGN PATENT DOCUMENTS

JP            09154293 A  *  6/1997  ............ Y02P 80/116
KR    10-2014-0094404        7/2014

*Primary Examiner* — Nicholas J Lane
*Assistant Examiner* — Stephen M Bowes
(74) *Attorney, Agent, or Firm* — H.C. Park & Associates, PLC

(57) ABSTRACT

An apparatus and a method to detect an offset of a motor position sensor. The apparatus includes a command voltage vector generation unit configured to, in a state in which a motor has been coupled to an electric booster braking system, generate a command voltage vector having a predefined command phase and command voltage and apply the command voltage vector to the motor such that a piston moves in a direction determined based on the current position of the piston, and an offset detection unit configured to detect the offset of the motor position sensor based on a phase difference between a command phase of the command voltage vector and an actually measured phase obtained by actually measuring, by the motor position sensor, a phase formed by rotors of the motor that are aligned as the command voltage vector is applied from the command voltage vector generation unit to the motor.

10 Claims, 6 Drawing Sheets

(51) Int. Cl.
  *B60T 8/172* (2006.01)
  *B60T 13/16* (2006.01)
  *B60T 13/74* (2006.01)
  *H02P 21/00* (2016.01)
  *H02P 25/022* (2016.01)

(52) U.S. Cl.
  CPC ............ B60T 13/745 (2013.01); H02P 21/00 (2013.01); *H02P 25/022* (2013.01)

(58) Field of Classification Search
  CPC .... B60T 8/171; B60T 13/745; B60T 2250/06; B60T 8/172; B60T 13/166; H02K 3/28; B62D 5/046
  See application file for complete search history.

(56) References Cited

U.S. PATENT DOCUMENTS

| | | | |
|---|---|---|---|
| 2016/0009263 A1* | 1/2016 | Feigel | B60T 8/321 303/15 |
| 2017/0237375 A1* | 8/2017 | Pramod | H02P 27/08 318/400.02 |
| 2017/0359005 A1* | 12/2017 | Ahmed | H02P 21/34 |
| 2019/0013761 A1* | 1/2019 | Seo | H02P 6/28 |
| 2019/0207493 A1* | 7/2019 | McMullen | H02K 1/08 |
| 2020/0153375 A1* | 5/2020 | Mori | H02P 6/28 |

* cited by examiner (a)

(b)

APPARATUS AND METHOD FOR DETECTING OFFSET OF MOTOR POSITION SENSOR

CROSS-REFERENCE TO RELATED APPLICATION

This application claims priority from and the benefit of Korean Patent Application No. 10-2019-0067206, filed on Jun. 7, 2019, which is hereby incorporated by reference for all purposes as if set forth herein.

BACKGROUND

Field

Exemplary embodiments of the present disclosure relate to an apparatus and a method for detecting an offset of a motor position sensor, and more particularly, to an apparatus and a method for detecting an offset of a motor position sensor applied to an electric booster braking system.

Discussion of the Background

Recently, an electric booster braking system has a tendency to increase in order to implement a vacuum-free brake system for improving fuel efficiency and implement regenerative braking cooperative control of active braking actuators such as an emergency braking system (autonomous emergency braking (AEB)) and electric vehicles. The electric booster braking system maintains most of a braking mechanism of an existing vacuum booster, but is different in a boosting mechanism from the vacuum booster in that the electric booster braking system boosts braking hydraulic pressure with the power of an electric booster that uses electric energy, that is, a three-phase synchronous motor, instead of boosting braking hydraulic pressure with pressure different between air pressure and vacuum pressure, unlike a vacuum booster. Furthermore, in order to efficiently drive the three-phase synchronous motor, the electric booster braking system generally uses a vector control technique which controls vectors of each axis by separating a magnetic flux axis and a torque axis.

In order to precisely drive the three-phase synchronous motor, it is necessary to accurately detect the rotor position of the motor through a motor position sensor. To this end, a process of accurately detecting an offset of the motor position sensor needs to be pre-determined. It is relatively simple to detect the offset of the motor position sensor at the single motor level before the motor is coupled to the electric booster braking system. However, when there is a limitation in the forward movement and backward movement of a piston such as after the motor is coupled to the electric booster braking system, it is difficult to accurately detect the offset of the motor position sensor. Therefore, when the offset of the motor position sensor needs to be detected after the motor is coupled to the electric booster braking system, the offset of the motor position sensor is inconveniently detected after the motor is separated.

The background art of the present disclosure is disclosed in Korean Patent Application Laid-Open No. 10-2014-0094404 (published on Jul. 30, 2014).

The above information disclosed in this Background section is only for enhancement of understanding of the background of the invention and, therefore, it may contain information that does not constitute prior art.

SUMMARY

Exemplary embodiments of the present invention is directed to an apparatus and a method to detect an offset of a motor position sensor, by which it is possible to accurately detect an offset of a motor position sensor without a separation operation even after a motor is coupled to an electric booster braking system.

In an embodiment, an apparatus configured to detect an offset of a motor position sensor includes a command voltage vector generation unit configured to, in a state in which a motor has been coupled to an electric booster braking system that operates to form braking hydraulic pressure through a piston that moves back and forth according to rotation of the motor, generate a command voltage vector having a predefined command phase and command voltage and apply the command voltage vector to the motor such that the piston moves in a direction determined based on the current position of the piston, and an offset detection unit configured to detect the offset of the motor position sensor based on a phase difference between a command phase of the command voltage vector and an actually measured phase obtained by actually measuring, by the motor position sensor, a phase formed by rotors of the motor aligned as the command voltage vector is applied from the command voltage vector generation unit to the motor.

In the present disclosure, the command voltage vector generation unit generates first to $N^{th}$ command voltage vectors having first to $N^{th}$ command phases, respectively, and sequentially applies the first to $N^{th}$ command voltage vectors to the motor (N is a natural number equal to or more 2), and the offset detection unit detects the offset of the motor position sensor based on respective first to $N^{th}$ phase differences between the first to $N^{th}$ command phases and actually measured first to $N^{th}$ phases obtained by actually measuring, by the motor position sensor, respective phases formed by the rotors of the motor aligned as the first to $N^{th}$ command voltage vectors are applied to the motor.

In the present disclosure, the command voltage vector generation unit generates first to $N^{th}$ command voltage vectors each having a first command voltage for allowing the piston to move forward according to forward rotation of the motor, and sequentially applies the first to $N^{th}$ command voltage vectors to the motor.

In the present disclosure, in a process of generating the first to $N^{th}$ command voltage vectors each having the first command voltage and sequentially applying the first to $N^{th}$ command voltage vectors to the motor, when a difference between an $M^{th}$ phase difference and an $M+1^{th}$ phase difference exceeds a preset threshold (M is a natural number smaller than N), the command voltage vector generation unit generates first to $N^{th}$ command voltage vectors each having a second command voltage for allowing the piston to move backward according to backward rotation of the motor, and sequentially applies the first to $N^{th}$ command voltage vectors to the motor.

In the present disclosure, the offset detection unit detects an average of the first to $N^{th}$ phase differences as the offset of the motor position sensor.

The present disclosure further includes a storage unit configured to store the offset of the motor position sensor detected by the offset detection unit, and a system operation determination unit configured to detect the offset of the motor position sensor through the command voltage vector generation unit and the offset detection unit when it is determined based on a state of the electric booster braking system that correction of the offset of the motor position sensor is necessary, and to apply the offset stored in the storage unit to the motor position sensor when it is determined based on the state of the electric booster braking system that the correction of the offset of the motor position sensor is not necessary.

In an embodiment, a method to detect an offset of a motor position sensor includes generating, by a command voltage vector generation unit, in a state in which a motor has been coupled to the electric booster braking system that operates to form braking hydraulic pressure through a piston that moves back and forth according to rotation of the motor, a command voltage vector having a predefined command phase and command voltage and applying the command voltage vector to the motor such that the piston moves in a direction determined based on a current position of the piston, and detecting, by an offset detection unit, the offset of the motor position sensor based on a phase difference between a command phase of the command voltage vector and an actually measured phase obtained by actually measuring, by the motor position sensor, a phase formed by rotors of the motor aligned as the command voltage vector is applied from the command voltage vector generation unit to the motor.

According to an aspect of the present disclosure, the offset of the motor position sensor is accurately detected after the motor and the electric booster braking system are coupled to each other, so that it is possible to remove an inconvenient operation of separating the motor and the system to detect the offset of the motor position sensor. Furthermore, whenever the electric booster braking system is powered on, the stability of the system operation is reviewed and the offset of the motor position sensor is corrected only when necessary, so that it is possible to improve the overall operational performance of the electric booster braking system. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
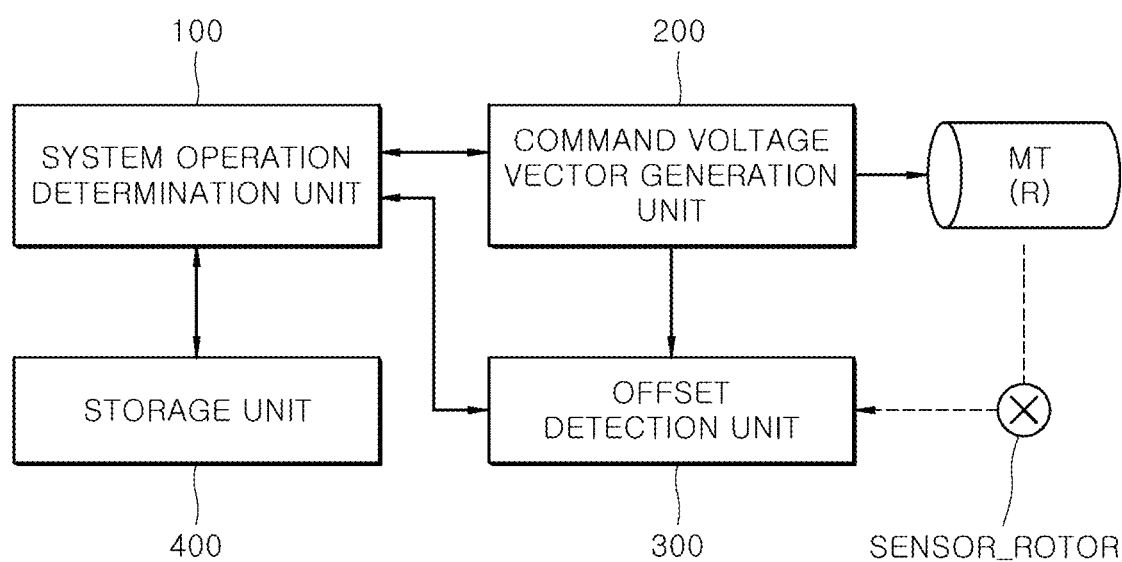
FIG. 1 is a block configuration diagram illustrating an apparatus configured to detect an offset of a motor position sensor in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, an apparatus and a method to detect an offset of a motor position sensor will be described below with reference to the accompanying drawings through various exemplary embodiments. In this process, the thickness of lines, the size of elements illustrated in the drawings may be exaggerated for the purpose of clarity and convenience of explanation. Terms to be described later are terms defined in consideration of functions in the present disclosure and may be changed according to the intention of a user or an operator, or practice. Accordingly, such terms should be defined based on the disclosure over the present specification.

Figure 2:
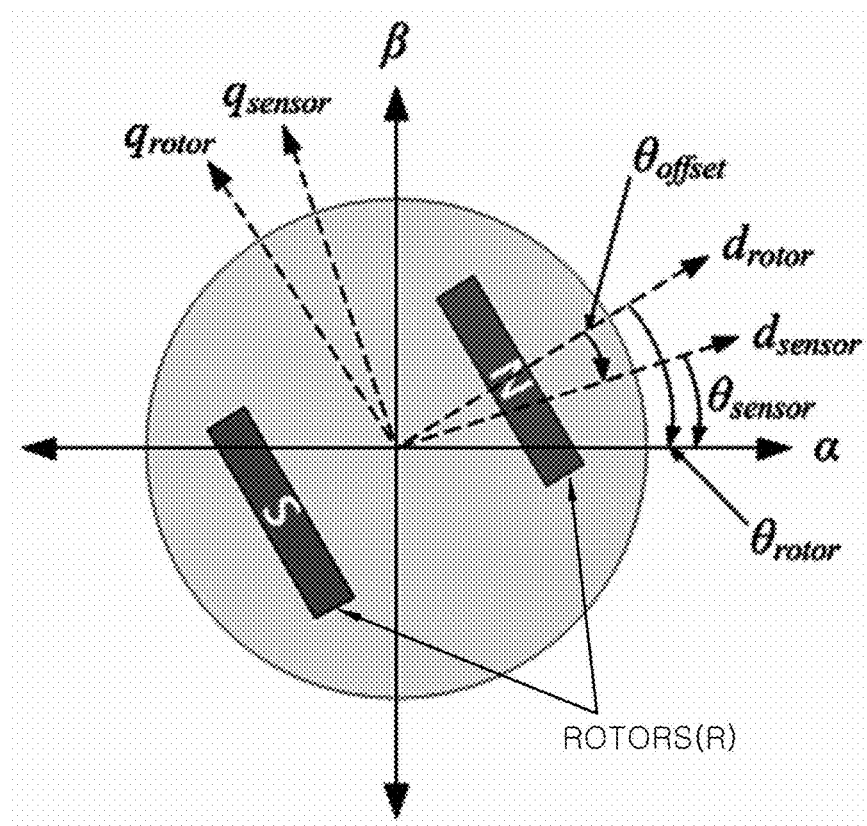
FIG. 2 is an exemplary diagram illustrating the offset of the motor position sensor in the apparatus configured to detect the offset of the motor position sensor in accordance with an embodiment of the present disclosure.
Figure 3:
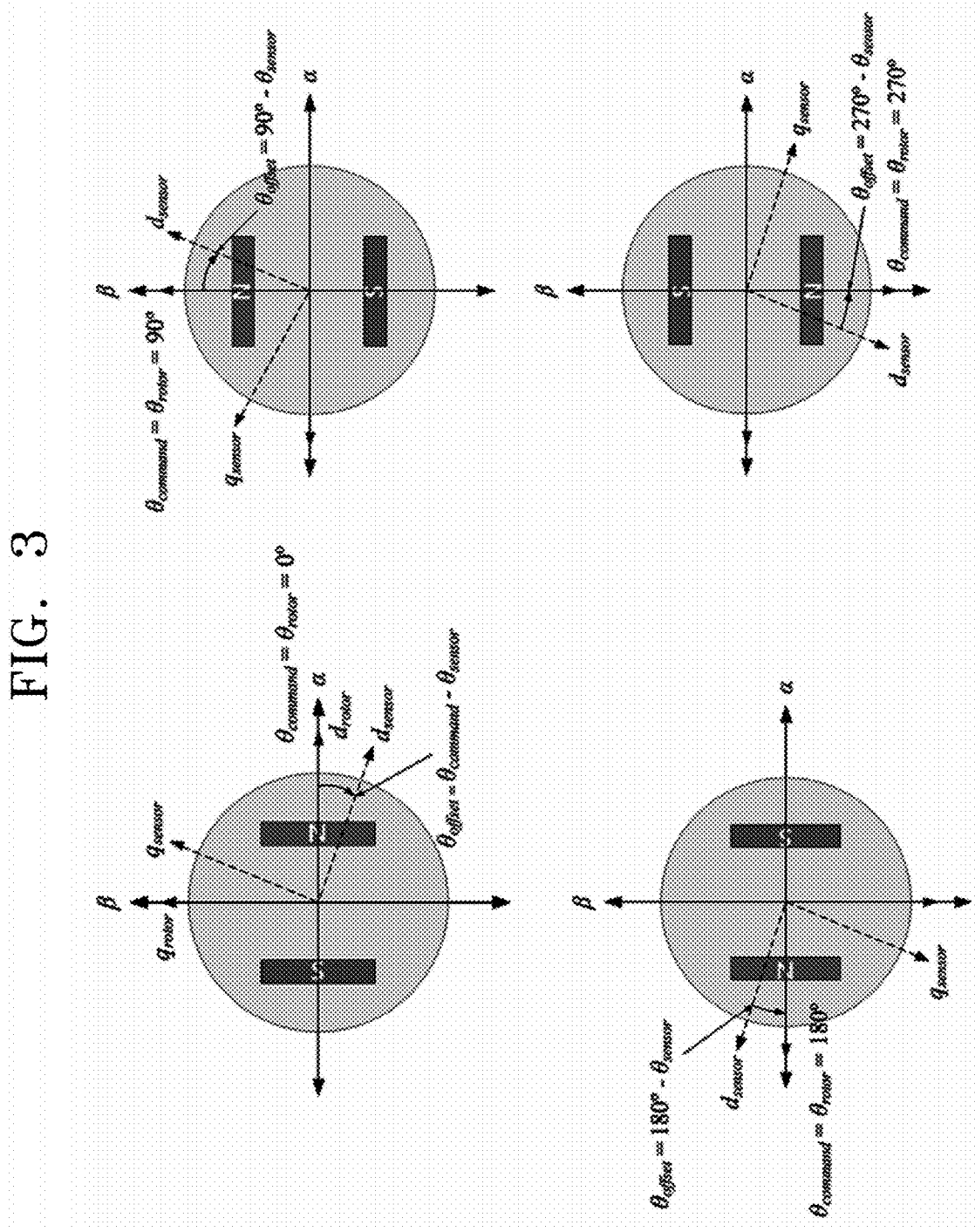
FIG. 3 is an exemplary diagram illustrating first to $N^{th}$ phase differences when first to $N^{th}$ command voltage vectors are applied to a motor in the apparatus configured to detect the offset of the motor position sensor in accordance with an embodiment of the present disclosure.
Figure 4:
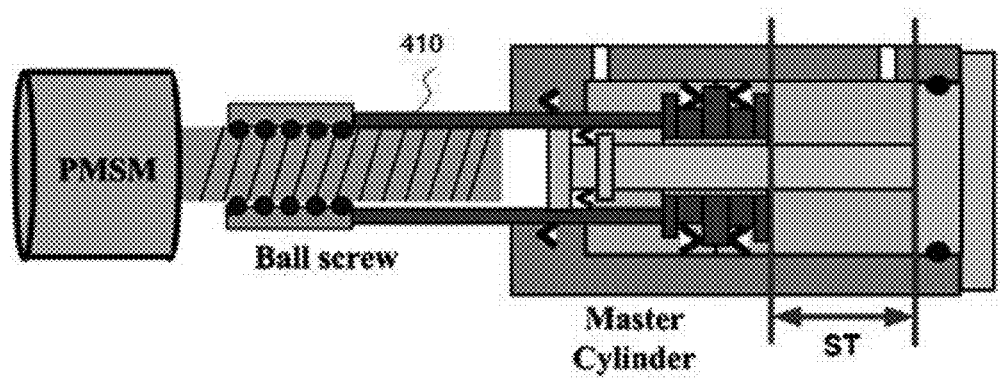
FIG. 4 is an exemplary diagram illustrating the forward movement and backward movement of a piston according to the forward rotation and backward rotation of the motor in the apparatus configured to detect the offset of the motor position sensor in accordance with an embodiment of the present disclosure.
Figure 4:
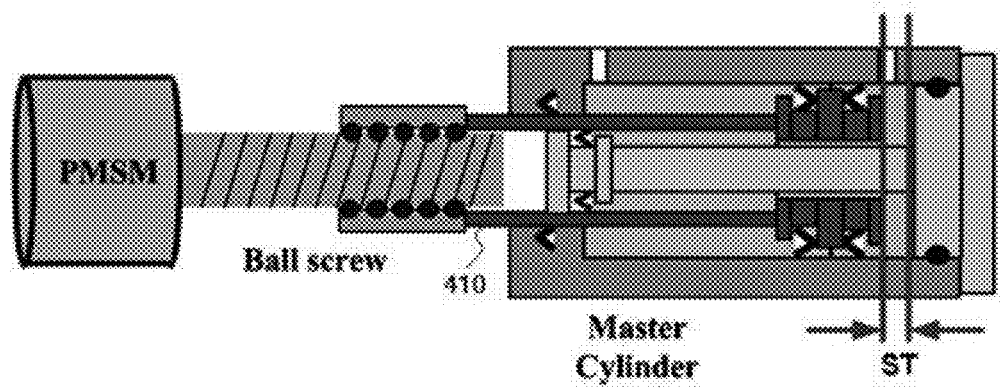
Figure 5:
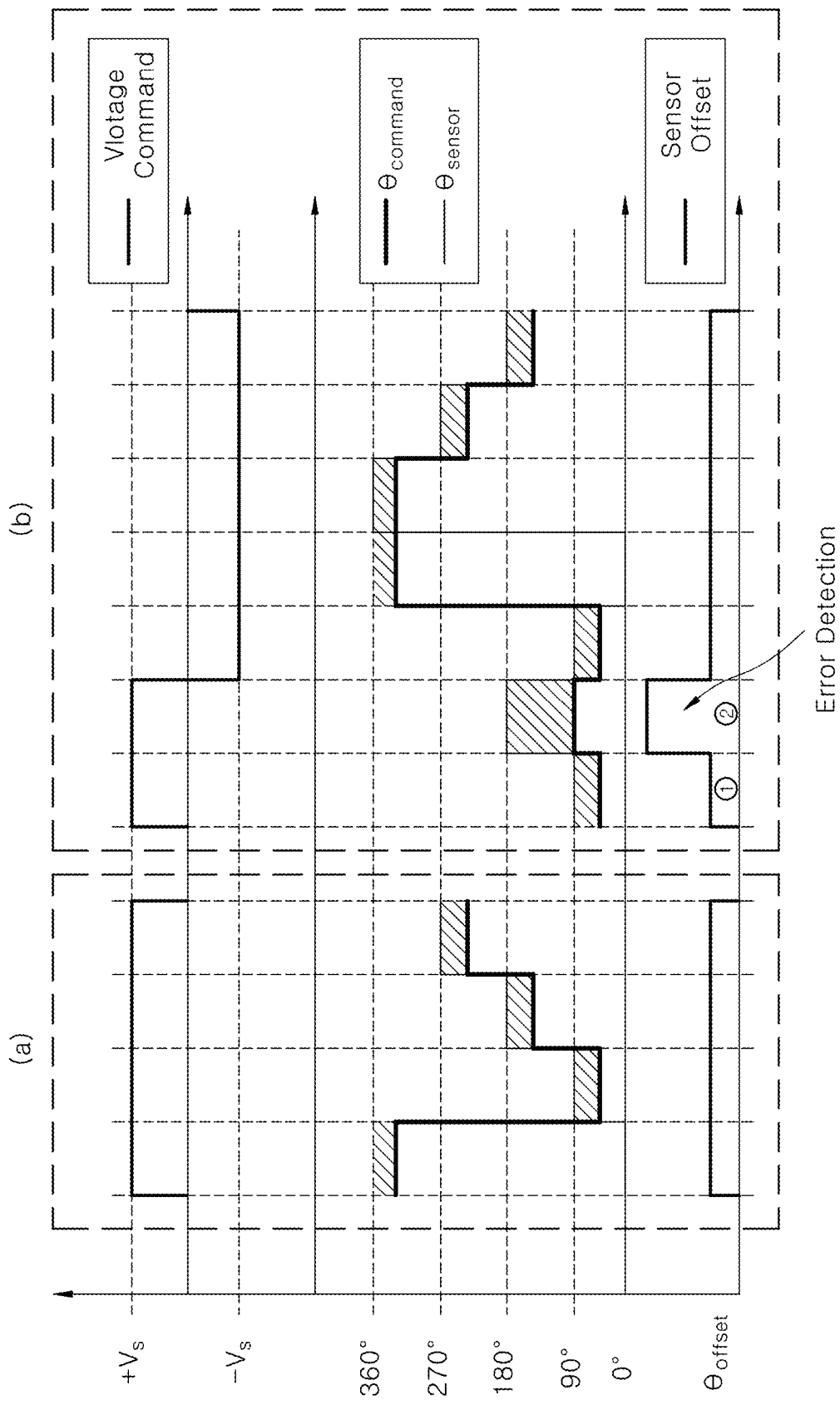
FIG. 5 is an exemplary diagram illustrating a process of detecting the offset of the motor position sensor for each case of the forward movement and backward movement of the piston according to the forward rotation and backward rotation of the motor in the apparatus configured to detect the offset of the motor position sensor in accordance with an embodiment of the present disclosure.

FIG. 1 is a block configuration diagram illustrating an apparatus configured to detect an offset of a motor position sensor in accordance with an embodiment of the present disclosure, FIG. 2 is an exemplary diagram illustrating the offset of the motor position sensor in the apparatus configured to detect the offset of the motor position sensor in accordance with an embodiment of the present disclosure, and FIG. 3 is an exemplary diagram illustrating first to $N^{th}$ phase differences when first to $N^{th}$ command voltage vectors are applied to a motor in the apparatus configured to detect the offset of the motor position sensor in accordance with an embodiment of the present disclosure. FIG. 4 is an exemplary diagram illustrating the forward movement and backward movement of a piston according to the forward rotation and backward rotation of the motor in the apparatus configured to detect the offset of the motor position sensor in accordance with an embodiment of the present disclosure, and FIG. 5 is an exemplary diagram illustrating a process of detecting the offset of the motor position sensor for each case of the forward movement and backward movement of the piston according to the forward rotation and backward rotation of the motor in the apparatus configured to detect the offset of the motor position sensor in accordance with an embodiment of the present disclosure.

First, the present embodiment may be applied to a state in which a motor has been coupled to an electric booster braking system that operates to form braking hydraulic pressure through a piston that moves back and forth according to the rotation of the motor. That is, as illustrated in FIG. 4, a smart booster braking system is implemented in a double-acting type and operates such that the rotational motion of a motor (PMSM) is converted into a linear motion by a ball screw and a master cylinder forms braking hydraulic pressure according to the forward movement and backward movement of the piston that is pressurized and depressurized, and the following embodiment may be performed in a state in which the motor has been coupled to the master cylinder through the ball screw and the piston.

Based on the above, an operation of the apparatus configured to detect the offset of the motor position sensor in accordance with the present embodiment will be described in detail.

Referring to FIG. 1, the apparatus configured to detect the offset of the motor position sensor in accordance with an embodiment of the present disclosure may include a system operation determination unit 100, a command voltage vector generation unit 200, an offset detection unit 300, and a storage unit 400.

The system operation determination unit 100 may determine, based on the state of an electric booster braking system, whether correction of an offset of a motor position sensor SENSOR_ROTOR that measures a rotor phase (that is, a rotation angle) of a motor MT is necessary. That is, when the electric booster braking system is powered on, the system operation determination unit 100 may preferentially determine whether the correction of the offset of the motor position sensor SENSOR_ROTOR is necessary, and at this time, may determine, based on the state of the electric booster braking system, whether the correction of the offset of the motor position sensor SENSOR_ROTOR is necessary. For example, when the motor MT is newly installed or re-installed in the electric booster braking system, the system operation determination unit 100 may determine that the correction of the offset of the motor position sensor SENSOR_ROTOR is necessary.

When it is determined that the correction of the offset of the motor position sensor SENSOR_ROTOR is necessary, the system operation determination unit 100 may detect the offset of the motor position sensor SENSOR_ROTOR through the command voltage vector generation unit 200 and the offset detection unit 300 as will be described below. When it is determined that the correction of the offset of the motor position sensor SENSOR_ROTOR is not necessary, the system operation determination unit 100 may apply an offset stored in the storage unit 400 to the motor position sensor SENSOR_ROTOR and measure the rotor phase of the motor MT as will be described below. The system operation determination unit 100 that performs the above operation may be implemented as an electric control unit (ECU) of the electric booster braking system that controls operations of the following command voltage vector generation unit 200, offset detection unit 300, and storage unit 400.

In a state in which the motor MT has been coupled to the electric booster braking system that operates to form braking hydraulic pressure through a piston that moves back and forth according to the rotation of the motor MT, the command voltage vector generation unit 200 may generate a command voltage vector having a predefined command phase and command voltage and apply the command voltage vector to the motor MT such that the piston moves in a direction determined based on the current position of the piston.

The command voltage vector having the predefined command phase and command voltage may be a voltage vector configured to align the rotors of the motor MT to a position corresponding to the predefined command phase (that is, for forming a phase, corresponding to the predefined command phase, in the rotors of the motor MT). Furthermore, the command voltage vector generation unit 200 may generate a command voltage vector configured to move the piston forward by rotating the motor MT forward or configured to move the piston backward by rotating the motor MT backward and apply the command voltage vector to the motor MT. Whether to move the piston forward or backward is determined according to the current position (that is, an initial position) of the piston, which will be described below.

The command voltage vector generation unit 200 may be implemented as an independent module, and may be configured to generate a command voltage vector having a spatial command voltage and command phase or may be configured to generate a command voltage vector by using an output of a current controller configured to control a current of the motor MT or a switching pattern of an inverter configured to drive the motor MT.

The offset detection unit 300 may detect the offset of the motor position sensor SENSOR_ROTOR based on the phase difference between a command phase of the command voltage vector and a measured phase obtained by actually measuring, by the motor position sensor SENSOR_ROTOR, a phase formed by the rotors of the motor MT aligned as the command voltage vector is applied from the command voltage vector generation unit 200 to the motor MT.

That is, as illustrated in FIG. 2, in a state in which the rotors R of the motor MT have been aligned as a command voltage vector having a predefined command phase $\theta_{rotor}$ is applied to the motor MT, a phase difference between the command phase $\theta_{rotor}$ of the command voltage vector and an actually measured phase $\theta_{sensor}$ of the rotors of the motor MT actually measured by the motor position sensor SENSOR_ROTOR is an offset $\theta_{offset}$ of the motor position sensor SENSOR_ROTOR, which is defined by Equation 1 below.

$$\theta_{offset} = \theta_{rotor} - \theta_{sensor} \qquad \text{Equation 1}$$

When the offset according to Equation 1 has a negative value, it may be corrected to a positive value according to Equation 2 below.

$$\theta_{offset} = 2\pi - (\theta_{rotor} - \theta_{sensor}) \qquad \text{Equation 2}$$

In a state in which the motor MT has been coupled to the electric booster braking system according to Equations 1 and 2, the offset of the motor position sensor SENSOR_ROTOR may be detected. At this time, in order to increase the accuracy of offset detection of the motor position sensor SENSOR_ROTOR by reducing a measurement error, in the present embodiment, a plurality of offsets may be detected using a plurality of command voltage vectors and an average of the plurality of offsets may be finally detected as the offset of the motor position sensor SENSOR_ROTOR.

Specifically, the command voltage vector generation unit 200 may generate first to $N^{th}$ command voltage vectors having first to $N^{th}$ command phases, respectively, and sequentially apply the first to $N^{th}$ command voltage vectors to the motor MT (N is a natural number equal to or more 2). Accordingly, the offset detection unit 300 may detect the offset of the motor position sensor SENSOR_ROTOR based on respective first to $N^{th}$ phase differences between the first to $N^{th}$ command phases and measured first to $N^{th}$ phases obtained by actually measuring, by the motor position sensor SENSOR_ROTOR, respective phases formed by the rotors of the motor MT aligned as the first to $N^{th}$ command voltage vectors are applied to the motor MT. Here, N may be variously selected according to the intention of a designer in consideration of the accuracy of the offset detection result, and FIG. 3 illustrates an example in which first to fourth phase differences are calculated in a state in which N is 4 and the first to fourth command phases are defined as 0°, 90°, 180°, and 270°, respectively. When the first to $N^{th}$ phase differences $\theta_{offset1}$ to $\theta_{offsetN}$ are calculated, the offset detection unit 300 may finally detect an average of the first to $N^{th}$ phase differences $\theta_{offset1}$ to $\theta_{offsetN}$ as the offset $\theta_{offset\_result}$ of the motor position sensor SENSOR_ROTOR according to Equation 3 below.

$$\theta_{offset\_result} = \frac{\theta_{offset1} + \theta_{offset2} + \theta_{offset3} \ldots + \theta_{offsetN}}{N} \quad \text{Equation 3}$$

As described above, the command voltage vector generation unit 200 of the present embodiment may generate a command voltage vector having a predefined command phase and command voltage and apply the command voltage vector to the motor MT such that the piston moves in a direction determined based on the current position of the piston.

Specifically, (a) of FIG. 4 illustrates a case where the piston 410 may move forward according to the forward rotation of the motor MT as the margin stroke ST of the piston in the forward rotation is equal to or more than a predetermined level, and the section (a) in FIG. 5 indicates a process of detecting the offset of the motor position sensor SENSOR_ROTOR when the piston 410 moves forward according to the forward rotation of the motor MT. Referring to (a) of FIG. 4 and (a) of FIG. 5, the command voltage vector generation unit 200 may generate first to $N^{th}$ command voltage vectors each having a first command voltage (for example, a voltage having a positive value, $+V_s$) for allowing the piston to move forward according to the forward rotation of the motor MT, and sequentially apply the first to $N^{th}$ command voltage vectors to the motor MT. Accordingly, the rotors are aligned in substantially the same direction as the stator magnetic flux, and the offset detection unit 300 may detect the offset of the motor position sensor SENSOR_ROTOR as an average of respective first to $N^{th}$ phase differences between the first to $N^{th}$ command phases and actually measured first to $N^{th}$ phases obtained by actually measuring, by the motor position sensor SENSOR_ROTOR, respective phases formed by the rotors aligned by the first to $N^{th}$ command voltage vectors.

Meanwhile, when a large load is applied by the hydraulic pressure of the master cylinder or when the piston is not able to move forward according to the forward rotation of the motor MT as the margin stroke ST of the piston in the forward rotation is smaller than the predetermined level as illustrated in (b) of FIG. 4, a physical limitation may exist in the forward movement of the piston. In a case where it is recognized that there exists a physical factor that limits the forward movement of the piston when the piston moves forward by the motor MT rotating forward by the first to $N^{th}$ command voltage vectors each having the first command voltage, the command voltage vector generation unit 200 may generate first to $N^{th}$ command voltage vectors each having a second command voltage for allowing the piston to move backward according to the backward rotation of the motor MT, and sequentially apply the first to $N^{th}$ command voltage vectors to the motor MT.

That is, in the process of generating the first to $N^{th}$ command voltage vectors each having the first command voltage and sequentially applying the first to $N^{th}$ command voltage vectors to the motor MT, when a difference between an $M^{th}$ phase difference and an $M+1^{th}$ phase difference exceeds a preset threshold (M is a natural number smaller than N), the command voltage vector generation unit 200 may determine that there exists a physical factor that limits the forward movement of the piston, generate first to $N^{th}$ command voltage vectors each having a second command voltage (for example, a voltage having a negative value, $-V_s$) to allow the piston to move backward according to the backward rotation of the motor MT, and sequentially apply the first to $N^{th}$ command voltage vectors to the motor MT.

Referring to the section (b) of FIG. 5, N is 4 and M is 1, and specifically, at the time point ①, the first command voltage vector having the first command voltage of $+V_s$ and the first command phase of 90° is applied to the motor MT and a first phase difference between the first command phase and the first actually measured phase is calculated. At the time point ②, the second command voltage vector having the first command voltage of $+V_s$ and the second command phase of 180° is applied to the motor MT and a second phase difference between the second command phase and the second actually measured phase is calculated. In such a case, as illustrated in FIG. 5, when the second phase difference is calculated beyond the threshold than the previously calculated first phase difference, it may be determined that the rotors of the motor MT have not been aligned according to the second command phase because the piston has contacted the end of the master cylinder or may no longer move forward due to a large load applied by the hydraulic pressure of the master cylinder. That is, when a difference between that the first phase difference and the second phase difference is equal to or more than the threshold (specifically, the second phase difference is calculated beyond the threshold than the first phase difference), it may be determined that the rotors of the motor MT are not able to follow the second command phase because the piston may no longer move forward. Therefore, the command voltage vector generation unit 200 may generate the first to $N^{th}$ command voltage vectors each having the second command voltage $-V_s$ for allowing the piston to move backward according to the backward rotation of the motor MT, and sequentially apply the first to $N^{th}$ command voltage vectors to the motor MT. Accordingly, the offset detection unit 300 may detect the offset of the motor position sensor SENSOR_ROTOR as an average of the respective first to $N^{th}$ phase differences between the first to $N^{th}$ command phases and actually measured first to $N^{th}$ phases obtained by actually measuring, by the motor position sensor SENSOR_ROTOR, respective phases formed by the rotors aligned by the first to $N^{th}$ command voltage vectors.

When the offset of the motor position sensor SENSOR_ROTOR is detected through the aforementioned process, the system operation determination unit 100 may store the detected offset of the motor position sensor SENSOR_ROTOR in the storage unit 400 (for example, an EEPROM). Then, when the electric booster braking system is powered on, the system operation determination unit 100 may determine whether correction of the offset of the motor position sensor SENSOR_ROTOR is necessary. When it is determined that the correction of the offset of the motor position sensor SENSOR_ROTOR is necessary, the system operation determination unit 100 may detect the offset of the motor position sensor SENSOR_ROTOR through the command voltage vector generation unit 200 and the offset detection unit 300. When it is determined that the correction of the offset of the motor position sensor SENSOR_ROTOR is not necessary, the system operation determination unit 100 may apply the offset stored in the storage unit 400 to the motor position sensor SENSOR_ROTOR and measure the rotor phase of the motor MT.

Figure 6:
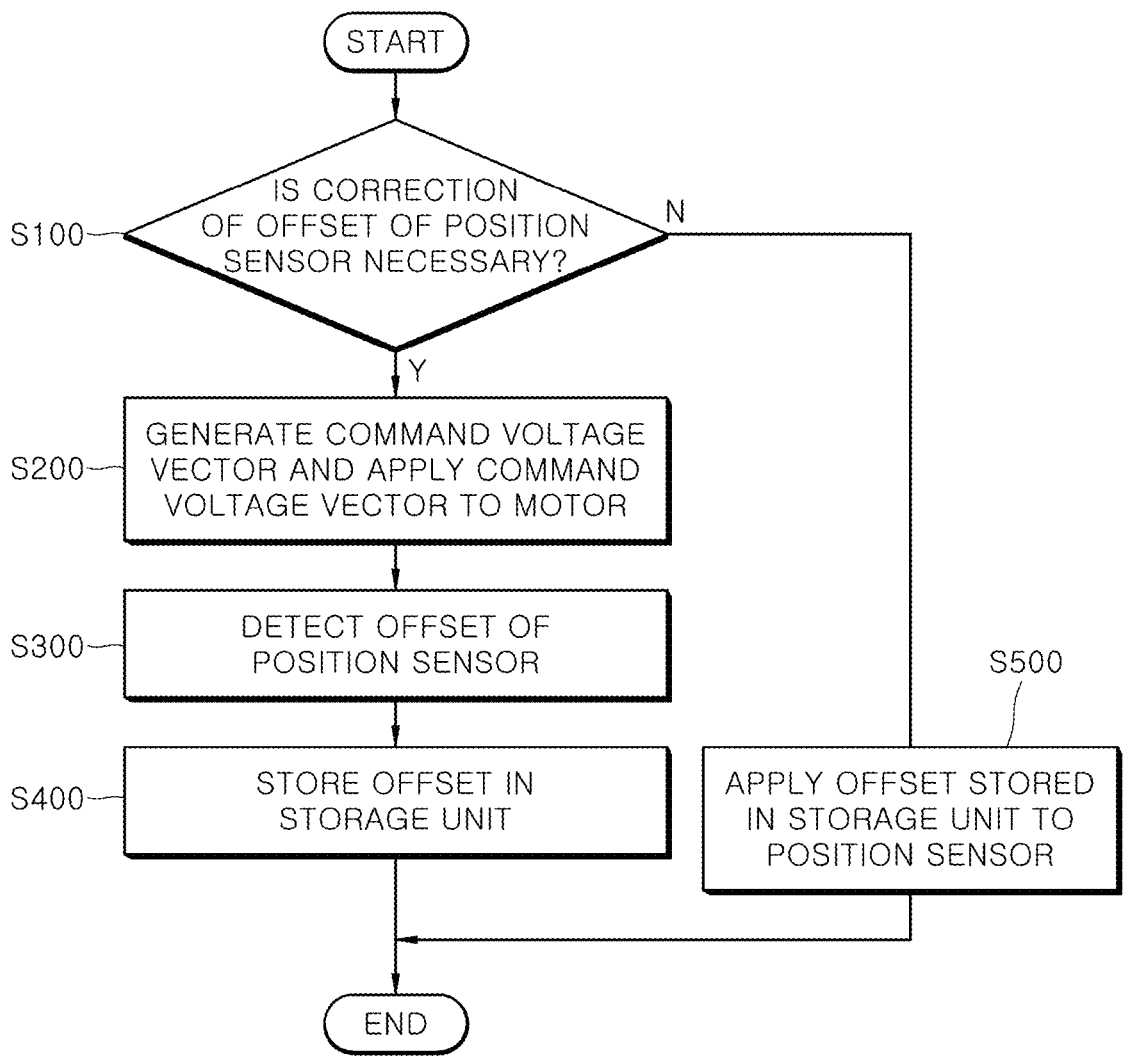
FIG. 6 is a flowchart illustrating a method to detect the offset of the motor position sensor in accordance with an embodiment of the present disclosure.

FIG. 6 is a flowchart illustrating a method to detect the offset of the motor position sensor in accordance with an embodiment of the present disclosure.

With reference to FIG. 6, the method to detect the offset of the motor position sensor in accordance with an embodiment of the present disclosure will be described. First, in a state in which the motor MT has been coupled to the electric booster braking system, the system operation determination unit 100 determines, based on the state of the electric booster braking system, whether the correction of the offset of the motor position sensor SENSOR_ROTOR is necessary (S100).

When it is determined in step S100 that the correction of the offset of the motor position sensor SENSOR_ROTOR is necessary, the command voltage vector generation unit 200 generates a command voltage vector having a predefined command phase and command voltage and applies the command voltage vector to the motor MT such that the piston moves in a direction determined based on the current position of the piston (S200).

Then, the offset detection unit 300 detects the offset of the motor position sensor SENSOR_ROTOR based on a phase difference between the command phase of the command voltage vector and an actually measured phase obtained by actually measuring, by the motor position sensor SENSOR_ROTOR, a phase formed by the rotors of the motor MT aligned as the command voltage vector is applied to the motor MT (S300).

In step S200, the command voltage vector generation unit 200 may generate first to $N^{th}$ command voltage vectors having first to $N^{th}$ command phases, respectively, and sequentially apply the first to $N^{th}$ command voltage vectors to the motor MT (N is a natural number equal to or more 2). In such a case, the command voltage vector generation unit 200 may generate first to $N^{th}$ command voltage vectors each having a first command voltage for allowing the piston to move forward according to the forward rotation of the motor MT, and sequentially apply the first to $N^{th}$ command voltage vectors to the motor MT. In the process of generating the first to $N^{th}$ command voltage vectors each having the first command voltage and sequentially applying the first to $N^{th}$ command voltage vectors to the motor MT, when a difference between an $M^{th}$ phase difference and an $M+1^{th}$ phase difference is equal to or more than a preset threshold (M is a natural number smaller than N), the command voltage vector generation unit 200 may generate first to $N^{th}$ command voltage vectors each having a second command voltage for allowing the piston to move backward according to the backward rotation of the motor MT, and sequentially apply the first to $N^{th}$ command voltage vectors to the motor MT.

Accordingly, in step S300, the offset detection unit 300 may detect the offset of the motor position sensor SENSOR_ROTOR based on respective first to $N^{th}$ phase differences between the first to $N^{th}$ command phases and actually measured first to $N^{th}$ phases obtained by actually measuring, by the motor position sensor SENSOR_ROTOR, respective phases formed by the rotors of the motor MT aligned as the first to $N^{th}$ command voltage vectors are applied to the motor MT, and may detect an average of the first to $N^{th}$ phase differences as the offset of the motor position sensor SENSOR_ROTOR.

When the offset of the motor position sensor SENSOR_ROTOR is detected through step S300, the system operation determination unit 100 stores the offset of the motor position sensor SENSOR_ROTOR detected by the offset detection unit 300 in the storage unit 400 (S400).

On the other hand, when it is determined in step S100 that the correction of the offset of the motor position sensor SENSOR_ROTOR is not necessary, the system operation determination unit 100 applies the offset stored in the storage unit 400 to the motor position sensor SENSOR_ROTOR and measures the rotor phase of the motor MT (S500).

As described above, in the present embodiment, the offset of the motor position sensor may be accurately detected after the motor and the electric booster braking system are coupled to each other, so that it is possible to remove an inconvenience operation of separating the motor and the system configured to detect the offset of the motor position sensor. Furthermore, whenever the electric booster braking system is powered on, the stability of the system operation is reviewed and the offset of the motor position sensor is corrected only when necessary, so that it is possible to improve the overall operational performance of the electric booster braking system.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for detecting an offset of a motor position sensor, the apparatus comprising:
   a command voltage vector generation unit configured to, in a state in which a motor has been coupled to an electric booster braking system that operates to form braking hydraulic pressure through a piston that moves back and forth according to rotation of the motor, generate a command voltage vector having a predefined command phase $\theta_{rotor}$ and command voltage and apply the command voltage vector to the motor such that the piston moves in a direction determined based on a current position of the piston;
   an offset detection unit configured to detect the offset of the motor position sensor based on a phase difference between a command phase of the command voltage vector and a measured phase of the command voltage, wherein the measured phase of the command voltage is obtained by measuring, by the position sensor, a phase formed by rotors of the motor that are aligned as the command voltage vector is applied from the command voltage vector generation unit to the motor,
   a storage unit configured to store the offset of the motor position sensor detected by the offset detection unit; and
   a system operation determination unit configured to determine whether correction of the offset of the motor position sensor is necessary based on a state of the electric booster braking system when the electric booster braking system is powered on, to detect the offset of the motor position sensor through the command voltage vector generation unit and the offset detection unit when it is determined that correction of the offset of the motor position sensor is necessary, and to apply the offset stored in the storage unit to the motor position sensor when it is determined that the correction of the offset of the motor position sensor is not necessary,
   wherein, in a state in which the rotors of the motor have been aligned as the command voltage vector having the predefined command phase $\theta_{rotor}$ is applied to the motor, a phase difference between the command phase $\theta_{rotor}$ of the command voltage vector and an actually measured phase $\theta_{sensor}$ of the rotors of the motor actually measured by the motor position sensor is the offset $\theta_{offset}$ of the motor position sensor, is defined by Equation 1, $\theta_{offset}=\theta_{rotor}-\theta_{sensor}$, wherein when the offset of the motor position sensor according to Equation 1 has a negative value, the offset [may be corrected to a positive value according to the equation $\theta_{offset}=2\pi-(\theta_{rotor}-\theta_{sensor})$.

2. The apparatus according to claim 1, wherein the command voltage vector generation unit is configured to generate first to $N^{th}$ command voltage vectors having first to $N^{th}$ command phases, respectively, and sequentially apply the first to $N^{th}$ command voltage vectors to the motor (N is a natural number greater than or equal to 2), and the offset detection unit is configured to detect the offset of the motor position sensor based on respective first to $N^{th}$ phase differences between the first to $N^{th}$ command phases and measured first to $N^{th}$ phases obtained by measuring, by the motor position sensor, respective phases formed by the rotors of the motor that are aligned as the first to $N^{th}$ command voltage vectors are applied to the motor.

3. The apparatus according to claim 2, wherein the offset detection unit is configured to detect an average of the first to $N^{th}$ phase differences as the offset of the motor position sensor.

4. The apparatus according to claim 2, wherein the command voltage vector generation unit is configured to generate first to $N^{th}$ command voltage vectors each having a first command voltage for allowing the piston to move forward according to forward rotation of the motor, and sequentially apply the first to $N^{th}$ command voltage vectors to the motor.

5. The apparatus according to claim 4, wherein, in a process of generating the first to $N^{th}$ command voltage vectors each having the first command voltage and sequentially applying the first to $N^{th}$ command voltage vectors to the motor, when a difference between an $M^{th}$ phase difference and an $M+1^{th}$ phase difference exceeds a preset threshold (M is a natural number smaller than N), the command voltage vector generation unit generates first to $N^{th}$ command voltage vectors each having a second command voltage different than the first command voltage, for allowing the piston to move backward according to backward rotation of the motor, and sequentially applies the first to $N^{th}$ command voltage vectors to the motor.

6. A method to detect an offset of a motor position sensor, the method comprising:

generating, by a command voltage vector generation unit, in a state in which a motor has been coupled to an electric booster braking system that operates to form braking hydraulic pressure through a piston that moves back and forth according to rotation of the motor, a command voltage vector having a predefined command phase and command voltage and applying the command voltage vector to the motor such that the piston moves in a direction determined based on a current position of the piston;

detecting, by an offset detection unit, the offset of the motor position sensor based on a phase difference between a command phase of the command voltage vector and a measured phase of the command voltage, wherein the measured phase of the command voltage is obtained by measuring, by the motor position sensor, a phase formed by rotors of the motor that are aligned as the command voltage vector is applied from the command voltage vector generation unit to the motor, determining, by a system operation determination unit, whether correction of the offset of the motor position sensor is necessary based on a state of the electric booster braking system when the electric booster braking system is powered on; and storing, by the system operation determination unit, the offset of the motor position sensor detected by the offset detection unit in a storage unit, wherein the applying and the detecting are performed when it is determined that the correction of the offset of the motor position sensor is necessary, and further comprise:

applying, by the system operation determination unit, the offset stored in the storage unit to the motor position sensor when it is determined based on a state of the electric booster braking system that the correction of the offset of the motor position sensor is not necessary, wherein, in a state in which the rotors of the motor have been aligned as the command voltage vector having the predefined command phase $\theta_{rotor}$ is applied to the motor, a phase difference between the command phase $\theta_{rotor}$ of the command voltage vector and an actually measured phase $\theta_{sensor}$ of the rotors of the motor actually measured by the motor position sensor is the offset $\theta_{offset}$ of the motor position sensor, is defined by Equation 1, $\theta_{offset}=\theta_{rotor}-\theta_{sensor}$, wherein when the offset of the motor position sensor according to Equation 1 has a negative value, the offset may be corrected to a positive value according to the equation $\theta_{offset}=2\pi-(\theta_{rotor}-\theta_{sensor})$.

7. The method according to claim 6, wherein, in the applying, the command voltage vector generation unit generates first to $N^{th}$ command voltage vectors having first to $N^{th}$ command phases, respectively, and sequentially applies the first to $N^{th}$ command voltage vectors to the motor (N is a natural number greater than or equal to 2), and in the detecting, the offset detection unit detects the offset of the motor position sensor based on respective first to $N^{th}$ phase differences between the first to $N^{th}$ command phases and measured first to $N^{th}$ phases obtained by measuring, by the motor position sensor, respective phases formed by the rotors of the motor that are aligned as the first to $N^{th}$ command voltage vectors are applied to the motor.

8. The method according to claim 7, wherein, in the detecting, the offset detection unit detects an average of the first to $N^{th}$ phase differences as the offset of the motor position sensor.

9. The method according to claim 7, wherein, in the applying, the command voltage vector generation unit generates first to $N^{th}$ command voltage vectors each having a first command voltage for allowing the piston to move forward according to forward rotation of the motor, and sequentially applies the first to $N^{th}$ command voltage vectors to the motor.

10. The method according to claim 9, wherein, in the applying, in a process of generating the first to $N^{th}$ command voltage vectors each having the first command voltage and sequentially applying the first to $N^{th}$ command voltage vectors to the motor, when a difference between an $M^{th}$ phase difference and an $M+1^{th}$ phase difference exceeds a preset threshold (M is a natural number smaller than N), the command voltage vector generation unit generates first to $N^{th}$ command voltage vectors each having a second command voltage different than the first command voltage, for allowing the piston to move backward according to backward rotation of the motor, and sequentially applies the first to $N^{th}$ command voltage vectors to the motor.

\* \* \* \* \*